US012564885B2

(12) United States Patent
Dutta et al.

(10) Patent No.: US 12,564,885 B2
(45) Date of Patent: Mar. 3, 2026

(54) OSCILLATING NOZZLE FOR SINUSOIDAL DIRECT METAL DEPOSITION

(71) Applicant: DM3D Technology, LLC, Auburn Hills, MI (US)

(72) Inventors: Bhaskar Dutta, Troy, MI (US); Vijayavel Bagavath-Singh, Troy, MI (US)

(73) Assignee: DM3D Technology, LLC, Auburn Hills, MI (US)

( * ) Notice: Subject to any disclaimer, the term of this patent is extended or adjusted under 35 U.S.C. 154(b) by 617 days.

(21) Appl. No.: 17/919,571

(22) PCT Filed: May 3, 2021

(86) PCT No.: PCT/US2021/030400
§ 371 (c)(1),
(2) Date: Oct. 18, 2022

(87) PCT Pub. No.: WO2021/225924
PCT Pub. Date: Nov. 11, 2021

(65) Prior Publication Data
US 2023/0150031 A1      May 18, 2023

Related U.S. Application Data

(60) Provisional application No. 63/019,464, filed on May 4, 2020.

(51) Int. Cl.
B22F 10/25       (2021.01)
B22F 12/37       (2021.01)
(Continued)

(52) U.S. Cl.
CPC .............. B22F 12/53 (2021.01); B22F 10/25 (2021.01); B22F 12/37 (2021.01); B33Y 10/00 (2014.12); B33Y 30/00 (2014.12); B22F 2998/10 (2013.01)

(58) Field of Classification Search
CPC ...................................................... B22F 10/25
See application file for complete search history.

(56) References Cited

U.S. PATENT DOCUMENTS

2003/0206820 A1    11/2003  Keicher et al.
2017/0217100 A1     8/2017  Gardiner
(Continued)

FOREIGN PATENT DOCUMENTS

EP          3689529 B1 *  6/2023  .............. B22F 10/10
WO      2019055343 A2     3/2019

OTHER PUBLICATIONS

International Search Report and Written Opinion of the International Searching Authority for PCT/US2021/030400, mailed Aug. 11, 2021 (15 pages).

*Primary Examiner* — Christopher S Kessler
(74) *Attorney, Agent, or Firm* — WARNER NORCROSS + JUDD LLP

(57)          ABSTRACT

A system and a method for the rapid manufacturing of objects by direct metal deposition are disclosed. The system and method include an oscillating nozzle suspended by a gantry system or a robotic arm over a workpiece build. In some embodiments, the workpiece build is supported by a rotary stage, while in other embodiments the workpiece build is stationary. In embodiments including a rotary stage, the oscillating nozzle oscillates back and forth along the X-axis, and/or rotates clockwise and counter-clockwise about the Y-axis, as the rotary stage rotates about the Z-axis, resulting in a sinusoidal toolpath. In embodiments lacking a rotary stage, the oscillating nozzle is continuously rotated about the Z-axis by the gantry system or the robot arm. The sinusoidal toolpath results in a sinusoidal deposition track, which is particularly useful for building walled structures having rotational symmetry, including conical structures.

5 Claims, 8 Drawing Sheets

(51) Int. Cl.
    *B22F 12/53*         (2021.01)
    *B33Y 10/00*         (2015.01)
    *B33Y 30/00*         (2015.01)

(56)             References Cited

U.S. PATENT DOCUMENTS

2017/0225445 A1    8/2017  Gardiner
2018/0250775 A1*  9/2018  Spink ..................... B23K 26/10

* cited by examiner

Tilt Axis

Linear Axis

100

18

20

12

10

14

16

Z

X

Y

Nozzle Travel Inner Wall Width Of A Stationary Workpiece

Nozzle Travel Outer Wall Width Of A Stationary Workpiece

Top View Schematic Of The Stationary Workpiece And Oscillating
Nozzle Making The Sinusoidal Toolpath Deposition Outer wall (deposited)

Toolpath

DMD Deposition

Inner wall (deposited)

Time/Workpiece length of the wall.

Top View Schematic Of The Rotating Workpiece And Oscillating
Nozzle Making The Sinusoidal Toolpath Deposition Gantry or robotic arm motion direction Gantry or robotic arm Rotary rotation Rotary axis Tilt Axis Linear axis

12

14

OSCILLATING NOZZLE FOR SINUSOIDAL DIRECT METAL DEPOSITION

CROSS-REFERENCE TO RELATED APPLICATIONS

This application claims the benefit of U.S. Provisional Application 63/019,464, filed May 4, 2020, the disclosure of which is incorporated by reference in its entirety.

FIELD OF THE INVENTION

The present invention relates to direct metal deposition, and in particular, the use of an oscillating nozzle in direct metal deposition to enhance speed and improve part quality.

BACKGROUND OF THE INVENTION

Various additive processes have been used to develop material onto a workpiece to enhance the dimensional and durability characteristics of the workpiece. One such process is known as direct metal deposition (DMD), in which a laser energy beam focused upon the workpiece is infused with metal alloy powder to become molten and deposited upon the workpiece. While this process has been proven technically feasible and commercially viable, its use is sometimes limited when manufacturing large objects due to the requirement of fast processing rates without sacrificing the process quality of the build.

When manufacturing symmetrical workpieces with at least one axis of symmetry, for example a hollow cylinder or a hollow cone, a rotary stage provides rotational movement of the build platform about a vertical axis as disclosed in WO2019/055343 to Dutta et al, the disclosure of which is incorporated by reference in its entirety. Multiple nozzles are spaced above the rotary stage for building a three-dimensional object supported by the rotary stage. At the time of deposition, the rotary stage rotates the build platform. For objects whose wall thickness is greater than the nozzle opening, multiple rotations of the building platform are typically required for each layer of the hollow object, resulting in increased processing times.

Accordingly, there remains a need for an improved direct metal deposition system for processing workpieces having symmetry about a vertical axis at an increased speed.

SUMMARY OF THE INVENTION

A system and a method for the rapid manufacturing of objects by direct metal deposition are disclosed, in which an oscillating nozzle is mounted on a gantry system or a robot arm to process a stationary workpiece or a workpiece rotated by a rotary stage.

The system and method include an oscillating nozzle suspended by a gantry system or a robotic arm over a workpiece build. In some embodiments, the workpiece build is supported by a rotary stage, while in other embodiments the workpiece build is stationary. In embodiments including a rotary stage, the oscillating nozzle oscillates back and forth along the X-axis, and/or rotates clockwise and counterclockwise about the Y-axis, as the rotary stage rotates about the Z-axis, resulting in a sinusoidal toolpath. In embodiments lacking a rotary stage, the oscillating nozzle is continuously rotated about the Z-axis by the gantry system or the robot arm. The sinusoidal toolpath results in a sinusoidal deposition track, which is particularly useful for building walled structures having rotational symmetry, including conical structures. The oscillating nozzle significantly reduces the deposition time to produce or repair a symmetrical object or a workpiece rotating on a rotary stage, resulting in a high deposition rate and better surface finish.

These and other features and advantages of the present disclosure will become apparent from the following description of particular embodiments, when viewed in accordance with the accompanying drawings and appended claims.

DETAILED DESCRIPTION OF THE CURRENT EMBODIMENTS

The current embodiments include a system and a method for direct metal deposition of a workpiece build, the workpiece build optionally having rotational symmetry. The system and the method include an oscillating nozzle supported above a workpiece build for generating a sinusoidal toolpath. The sinusoidal toolpath decreases the build time for hollow workpieces having vertical and angled wall features. The workpieces are completely or partially formed by DMD, while in other embodiments the workpieces are rebuilt or repaired by DMD.

Figure 1:
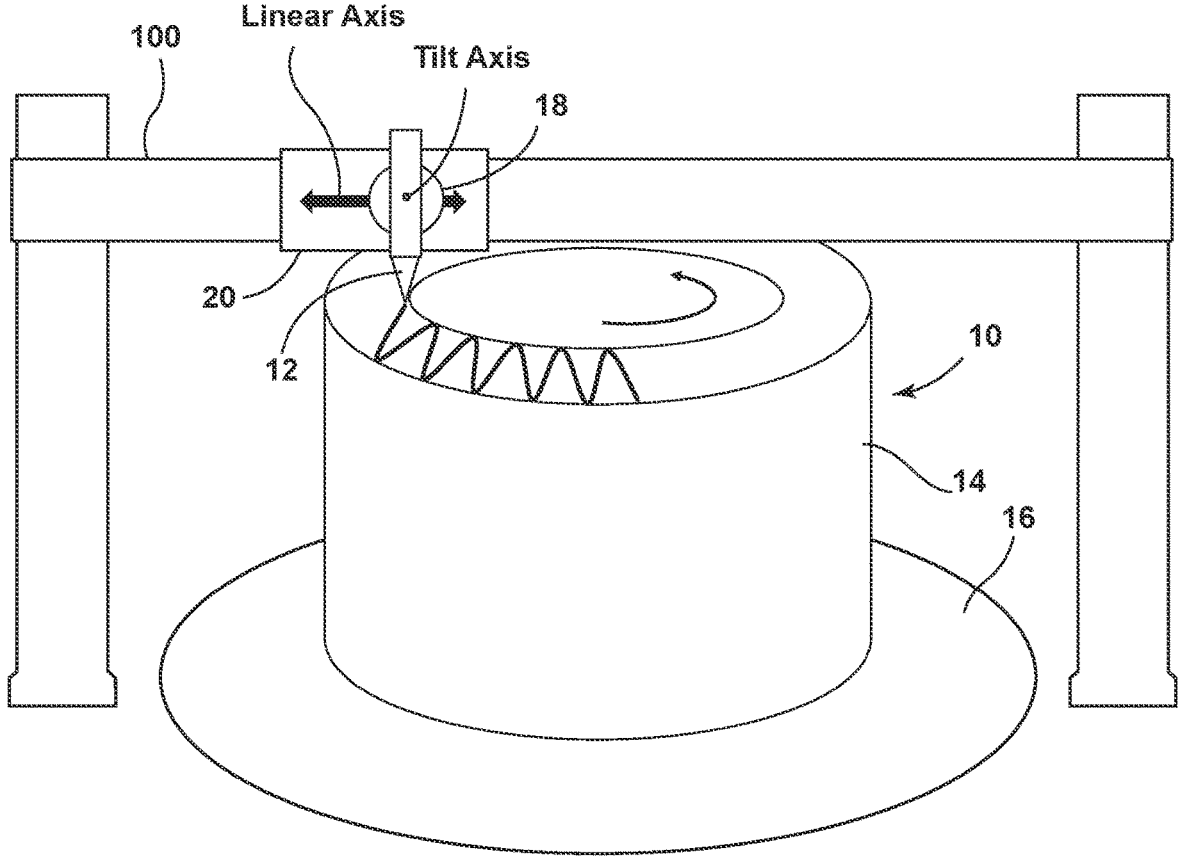
FIG. 1 is a schematic of the rotating symmetrical workpiece and oscillating nozzle making the sinusoidal toolpath deposition when tilt axis at home position (hollow cylinder).
Figure 1:
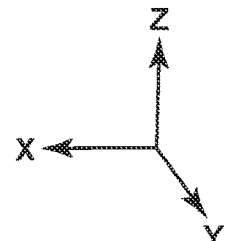

Referring to FIG. 1, a rotating symmetrical workpiece 10 and oscillating nozzle 12 is illustrated. The workpiece 10 includes complete rotational symmetry about the Z-axis in the present embodiment, while in other embodiments only a portion of the workpiece 10 is symmetrical about the Z-axis. The workpiece 10 includes a sidewall 14 formed in successive layers according to a direct metal deposition process. As noted above, direct metal deposition is a laser-based additive manufacturing process in which metal alloy powder is directly blown into a melt pool. The laser energy beam and the metal alloy powder interact at or slightly above the workpiece surface, and the metal allow powder is absorbed into the laser-induced melt pool, which rapidly solidifies. The nozzle 12 deposits a track in a sinusoidal pattern, multiple overlapping tracks form a layer, and multiple layers form the three-dimensional workpiece 10. The oscillating nozzle 12 is adapted for performing DMD, for example the nozzle disclosed in U.S. Pat. No. 6,534,745 entitled "Nozzle Particularly Suited to Direct Metal Deposition," the disclosure of which is incorporated by reference in its entirety. The oscillating nozzle 12 is suspended over a build platform, for example a rotary stage 16, and the oscillating nozzle 12 is pivotable about a tilt axis via a rotary motor 18 and is translatable along a linear axis via a linear motor 20.

In particular, a robotic arm or an overhead gantry 100 a controls movement of the oscillating nozzle 12 in accordance with a toolpath for the workpiece 10. The oscillating nozzle 12 is moveable along the X-axis, shown in FIG. 1, and the oscillating nozzle 12 is rotatable about the Y-axis, shown in FIGS. 2 and 3. In one embodiment, a rotary stage 16 causes the workpiece 10 to continuously rotate about the Z-axis during this back-and-forth movement of the nozzle 12, such that the nozzle 12 deposits a track of additive material in a sinusoidal pattern. The rotary stage 16 receives rotational movement from a rotary servo motor. In other embodiments the workpiece 10 is stationary, and the oscillating nozzle 12 continuously orbits the workpiece about the Z-axis. The amplitude of the sinusoidal pattern determines the thickness of the sidewall 14, such that the thickness of the sidewall 14 can increase or decrease with successive layers of the workpiece build. The peaks of the sinusoidal pattern (the portion of the sinusoidal pattern having zero slope) form the inner and outer contours of the sidewall 14, and the remainder of the sinusoidal pattern (the portion of the sinusoidal pattern having a non-zero slope) determine the inner quality of the sidewall 14.

Figure 2:
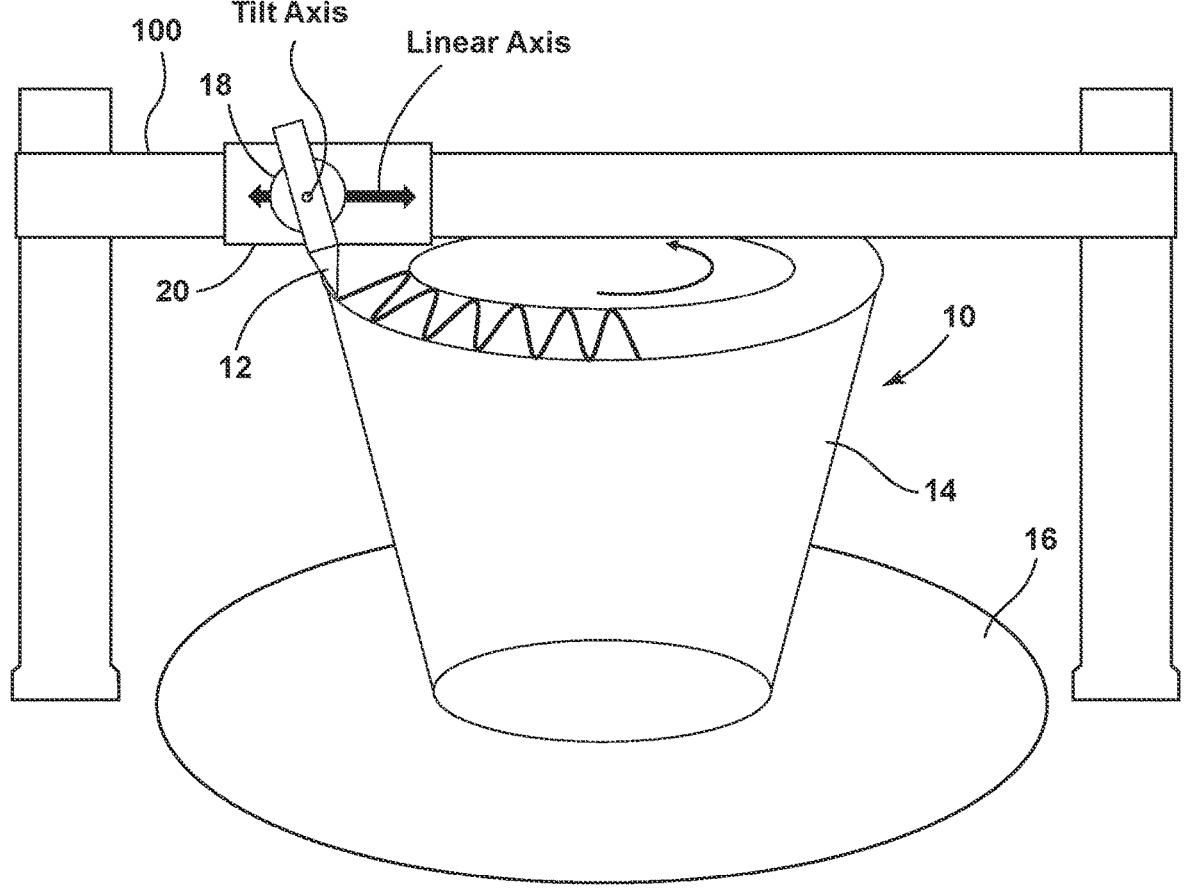
FIG. 2 is a schematic of the rotating symmetrical workpiece and oscillating nozzle making the sinusoidal toolpath deposition when tilt axis at positive angle (hollow expanding cone).
Figure 2:
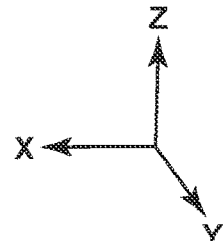
Figure 3:
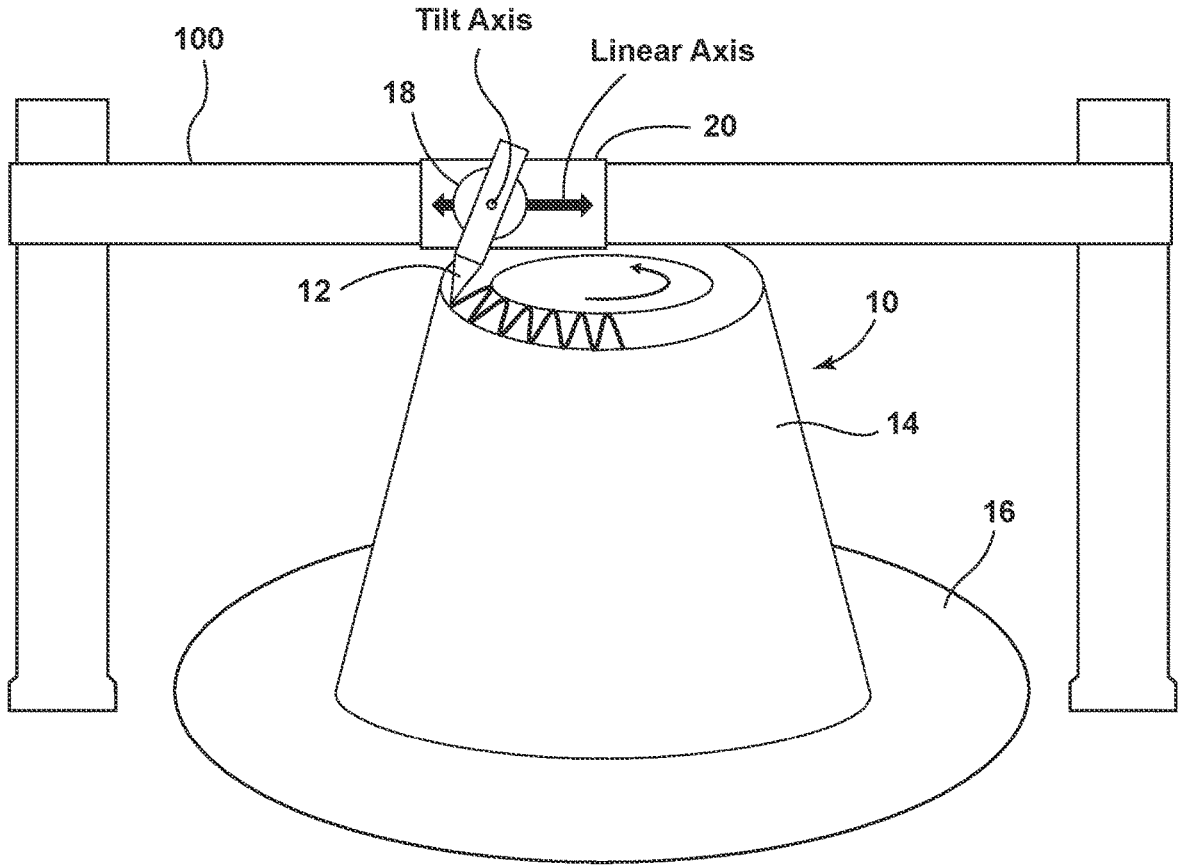
FIG. 3 is a schematic of the rotating symmetrical workpiece and oscillating nozzle making the sinusoidal toolpath deposition when tilt axis at negative angle (hollow tapering cone).
Figure 3:
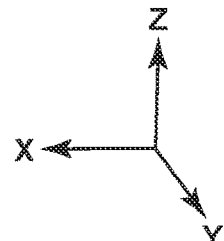
Figure 4:
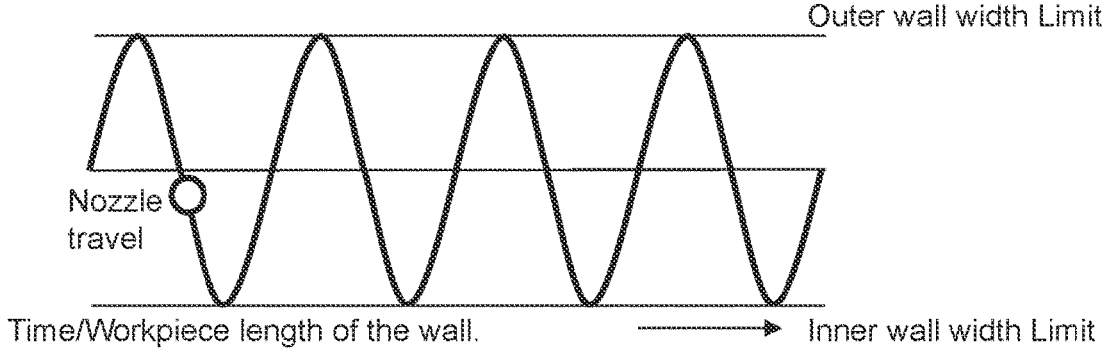
FIG. 4 shows the nozzle moving linearly towards inner wall of the stationary workpiece.
Figure 5:
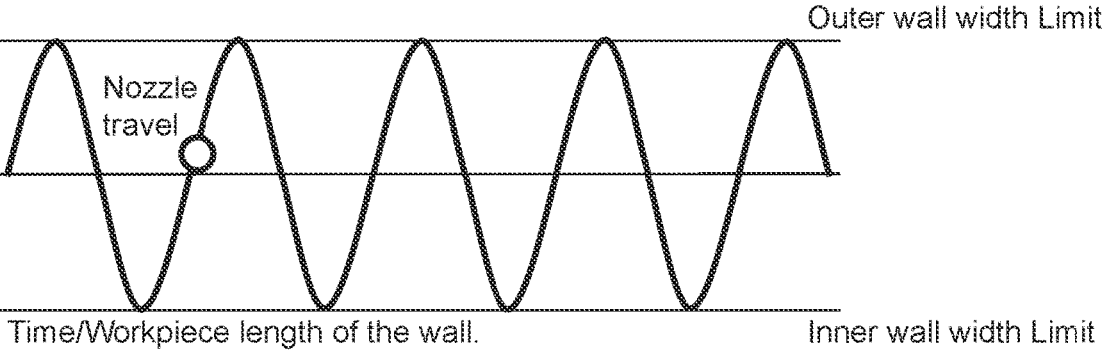
FIG. 5 shows the nozzle moving linearly towards outer wall of the stationary workpiece.
Figure 6:
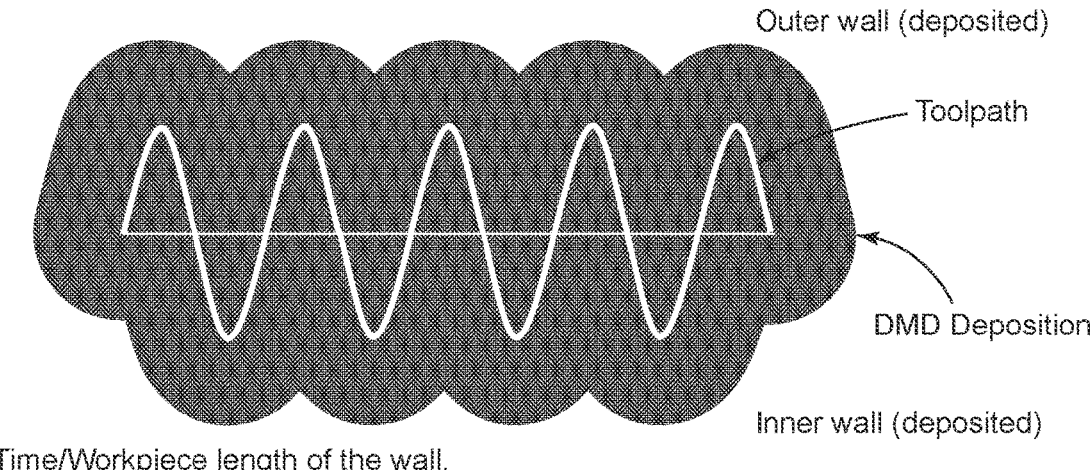
FIG. 6 shows the top view schematic of the stationary workpiece and oscillating nozzle making of the sinusoidal toolpath.
Figure 7:
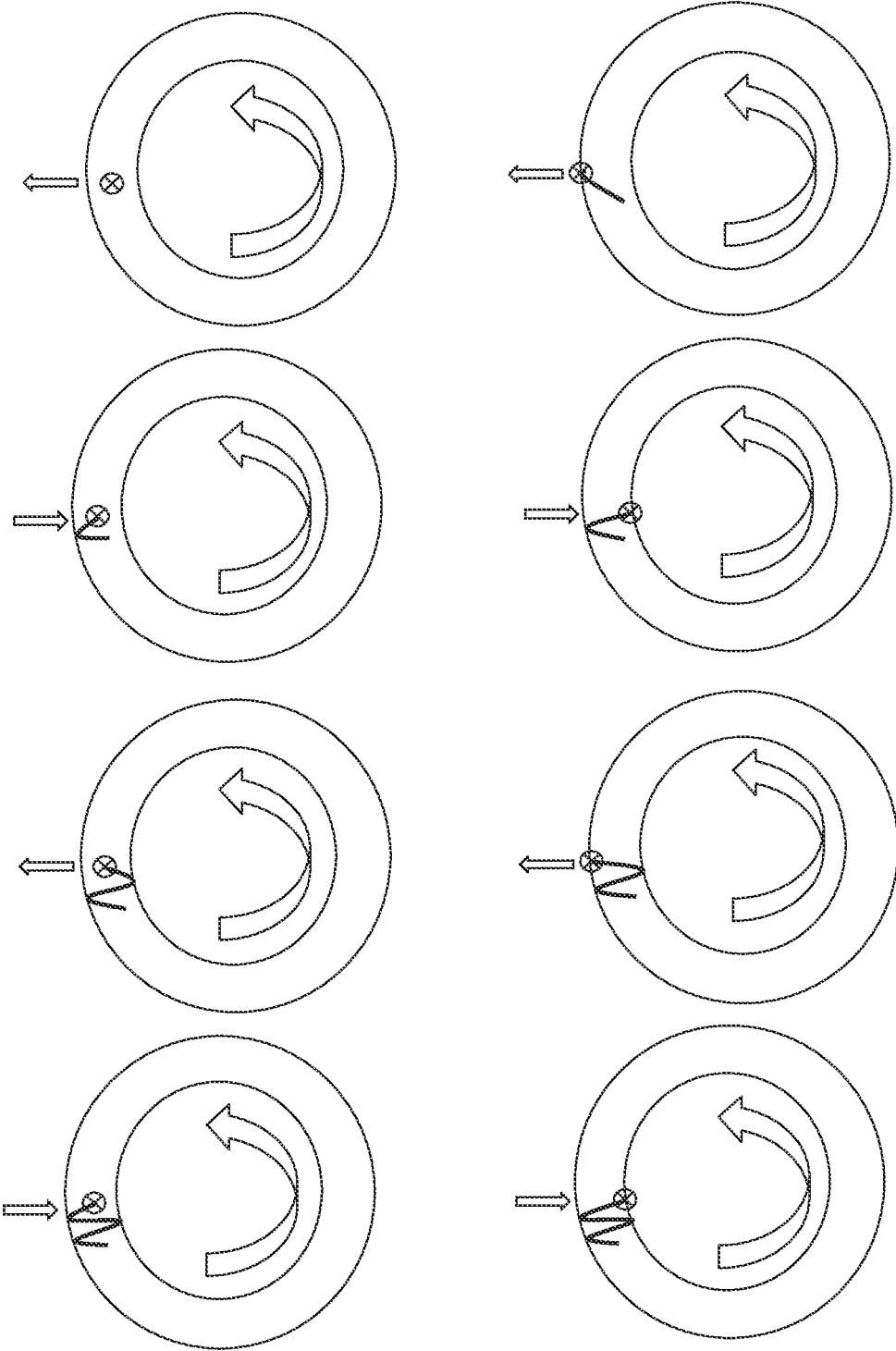
FIG. 7 shows the top view schematic of the rotating workpiece and oscillating nozzle making of the sinusoidal toolpath.

As shown in FIG. 1, the tilt axis of the oscillating nozzle 12 is in the home position for forming successive layers of a hollow cylinder. The tilt axis of the oscillating nozzle 12 includes a positive angle in FIG. 2 for forming successive layers of a hollow expanding cone. The tilt axis of the oscillating nozzle 12 includes a negative angle in FIG. 3 for forming successive layers of a hollow tapering cone. In FIGS. 2 and 3, the oscillating nozzle 12 is oriented normal to the workpiece feature, providing a perpendicular additive build. FIGS. 4 and 5 depict the toolpath for a stationary workpiece build. As shown in FIG. 4, the oscillating nozzle 12 is depicted as moving linearly towards the inner wall of the stationary workpiece 10, while in FIG. 5 the oscillating nozzle 12 is depicted as moving linearly towards the outer wall of the stationary workpiece 10. In these embodiments, the gantry (or the robot arm) rotate the nozzle about the Z-axis while the nozzle oscillates in the manner set forth above. FIG. 6 shows the top view schematic of the stationary workpiece 10 and oscillating nozzle 12 making of the sinusoidal toolpath. As noted above, the peaks of the sinusoidal toolpath form the inner and outer contours of the sidewall 14, and the remainder of the sinusoidal toolpath determine the inner quality of the sidewall 14. The sinusoidal toolpath deposits a sinusoidal track of metal alloy to form a layer of the workpiece build, and multiple layers form the completed three-dimensional workpiece. This is further illustrated in FIG. 7, which shows the top view schematic of the rotating workpiece 10 and oscillating nozzle 12 making of the sinusoidal toolpath.

Figure 8:
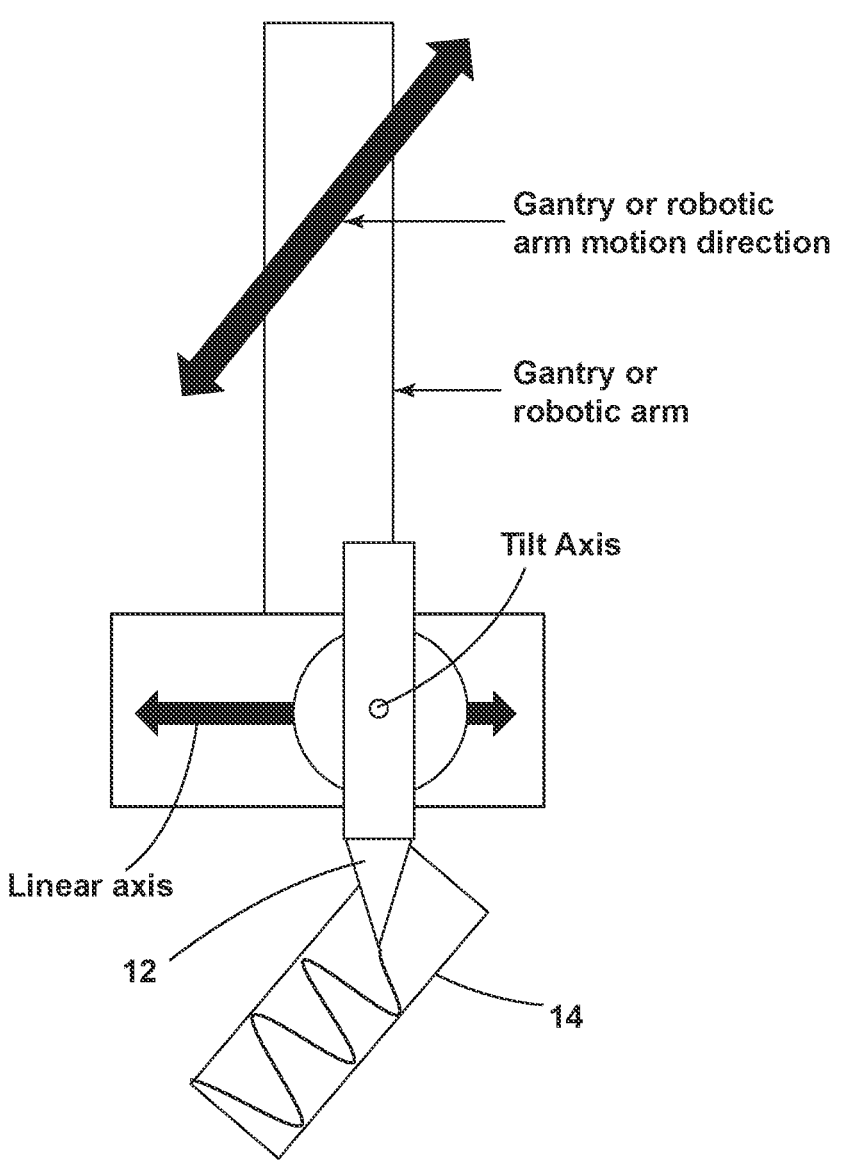
FIG. 8 shows an oscillating nozzle mounted onto a gantry or a robotic arm which moves in one direction to deposit a wall feature on a stationary workpiece.
Figure 9:
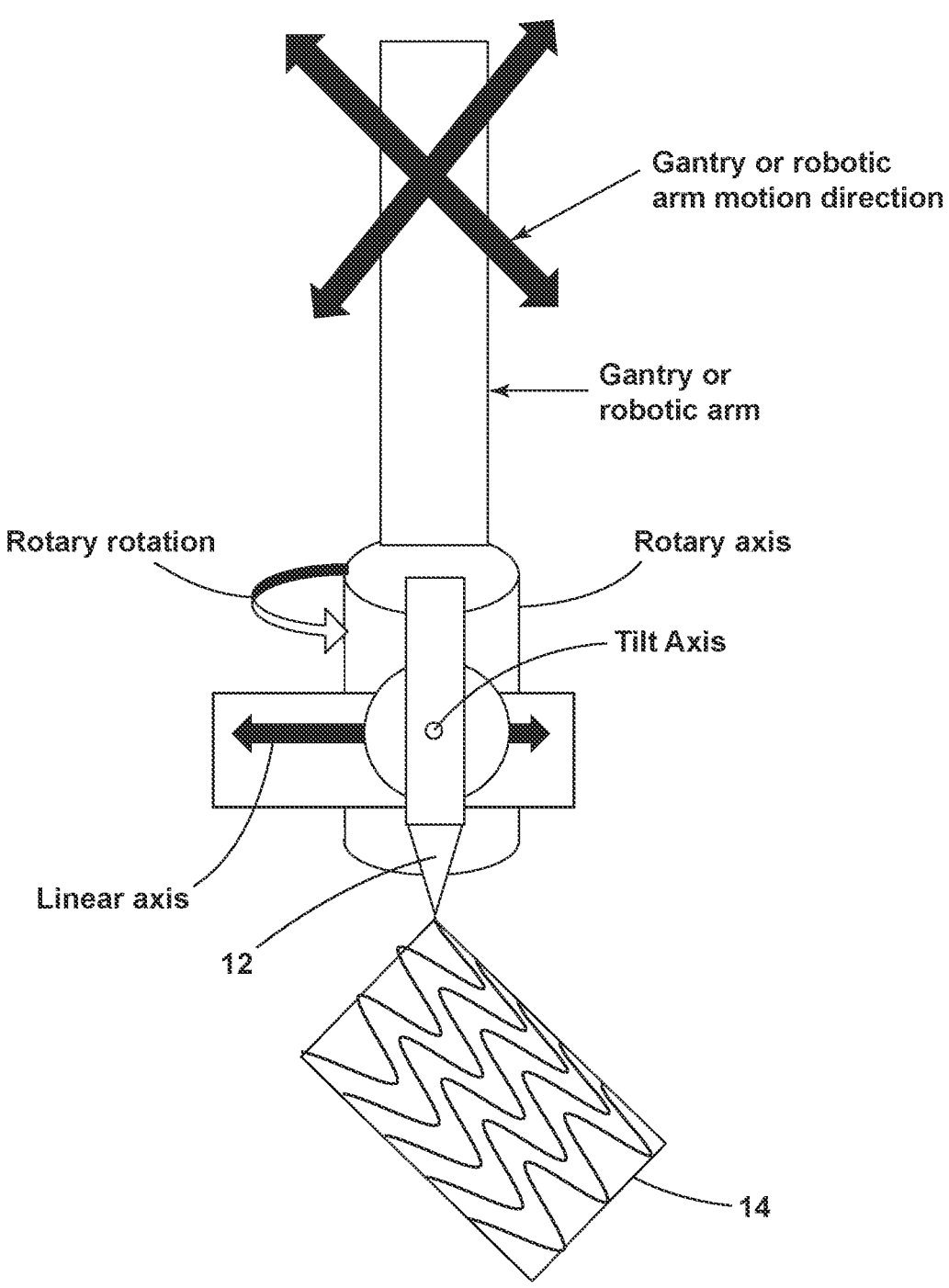
FIG. 9 shows an oscillating nozzle mounted onto a gantry or a robotic arm which rotates to maintain the oscillating nozzle at a perpendicular axis to the linear directional motion of the nozzle over a stationary workpiece.

In another embodiment, the oscillating nozzle is mounted to a gantry or robotic arm and deposits onto a stationary workpiece. In FIG. 8, the gantry or robotic arm moves in a linear motion, carrying the oscillating nozzle 12, which deposits a wall feature 14 onto a stationary workpiece or build platform. In particular, the oscillating nozzle 12 is mounted onto a gantry or a robotic arm which moves in a linear direction as the oscillating nozzle 12 pivots about the tilt axis and/or translates along the linear axis. In FIG. 9, the gantry or robotic arm moves in two directional motion, carrying the oscillating nozzle 12, which deposits a rectangle 14 on a stationary workpiece. In particular, the gantry or a robotic arm rotates to maintain the oscillating nozzle 12 at a perpendicular axis to the linear directional motion of the nozzle 12 over a stationary workpiece 14. The gantry or robotic arm may move in multi-directional toolpath motion, carrying the oscillating nozzle to create sinusoidal deposition on a stationary workpiece.

The above description is that of current embodiments. Various alterations can be made without departing from the spirit and broader aspects of the invention as defined in the claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of performing direct material deposition upon a workpiece that has rotational symmetry about a vertical axis, comprising the steps of:
   positioning a nozzle on an overhead gantry that defines a linear axis, the nozzle being adapted to oscillate along the linear axis and being adapted to pivot about a tilt axis that is orthogonal to the linear axis;
   causing the nozzle to project a laser beam and discharge a metal powder toward the workpiece while oscillating along the linear axis or pivoting about the tilt axis, the workpiece being supported on a rotary stage that rotates about the vertical axis;
   depositing successive layers onto the workpiece by causing the rotary stage to rotate about the vertical axis as the nozzle is oscillating along the linear axis or pivoting about the tilt axis, such that the nozzle deposits a metal powder along a sinusoidal toolpath, wherein inner and outer peaks of the sinusoidal toolpath form inner and outer contours of the workpiece, thereby forming successive layers of the workpiece by direct metal deposition.

2. The method set forth in claim 1, wherein the additive layer comprises a wall feature having a length and a width, further including causing relative movement of the nozzle along the length of the wall feature and causing the nozzle to trace the width of the wall feature.

3. The method set forth in claim 2, further including adjusting a speed of the nozzle during relative movement of the nozzle along the length of the wall feature.

4. The method set forth in claim 1, wherein the tilt axis of the oscillating nozzle positions the nozzle perpendicular to the workpiece.

5. The method set forth in claim 1, further including causing the workpiece to cease rotation as the nozzle oscillates along the linear axis or pivots about the tilt axis, such that the nozzle continues the additive layer of the workpiece without rotation of the workpiece.

* * * * *